(No Model.) 2 Sheets—Sheet 1.
D. G. WYETH.
SLEIGH RUNNER FOR WHEELED VEHICLES.
No. 400,381. Patented Mar. 26, 1889.
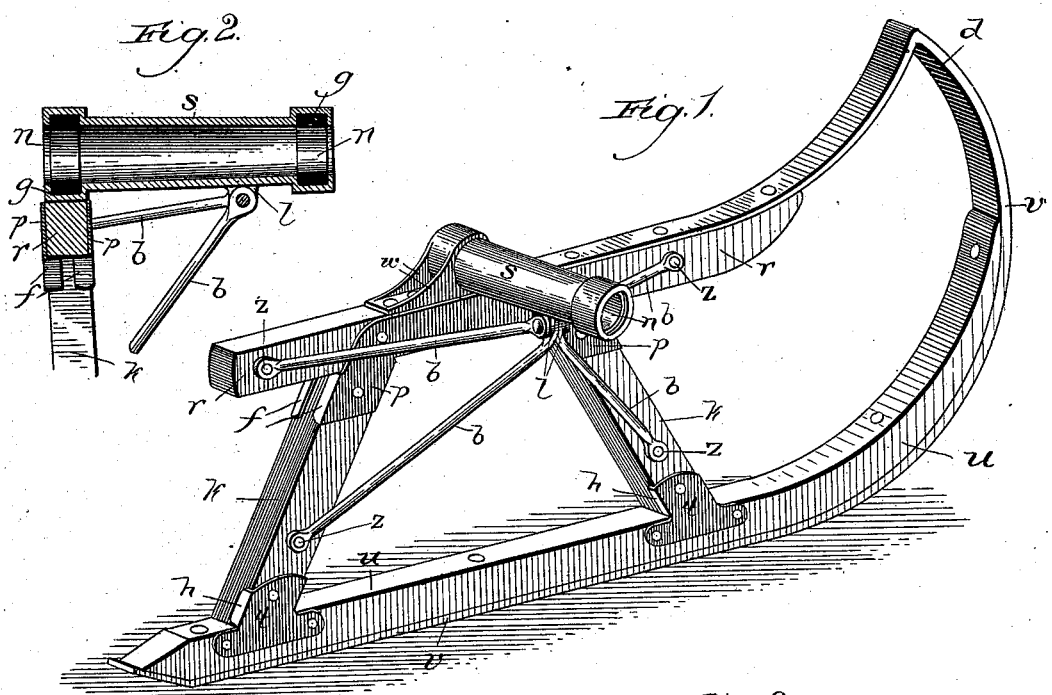
Witnesses:
Chas. E. Taylor
Chas. E. Gorton
Inventor:
David G. Wyeth
By Newton Wyeth
Att'y.

(No Model.) 2 Sheets—Sheet 2.
D. G. WYETH.
SLEIGH RUNNER FOR WHEELED VEHICLES.
No. 400,381. Patented Mar. 26, 1889.
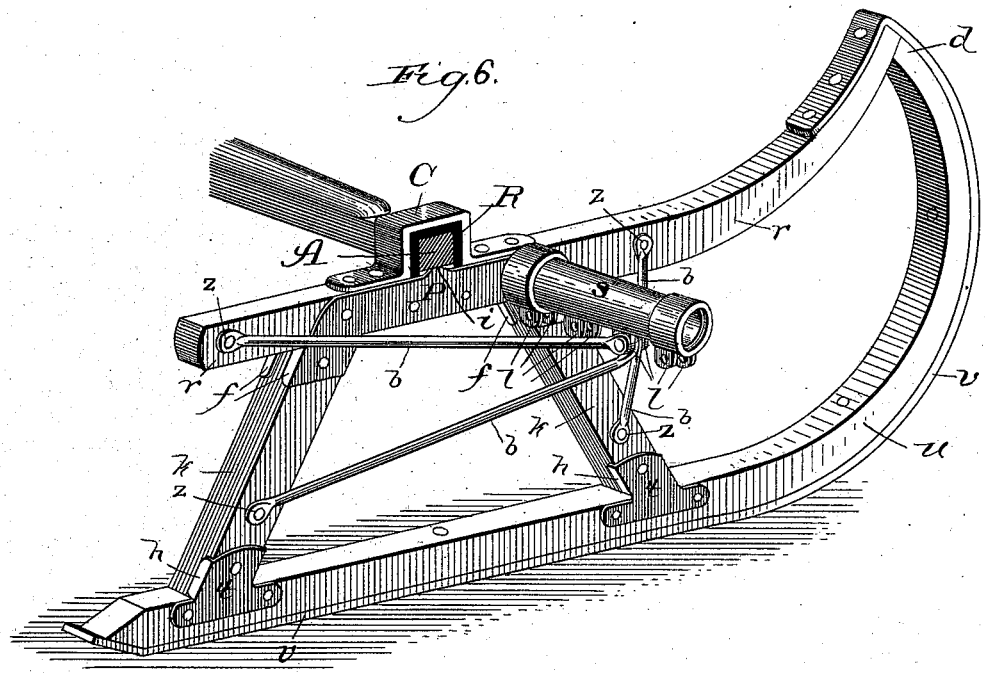
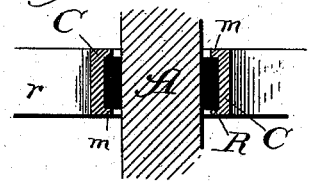
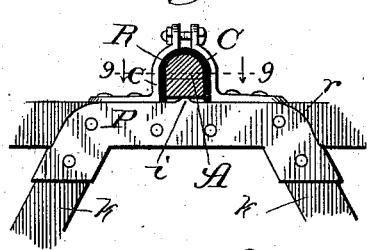
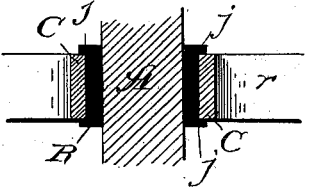
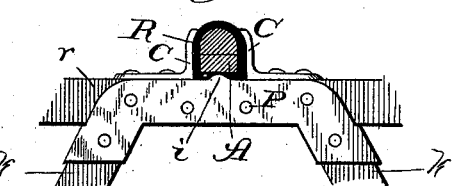
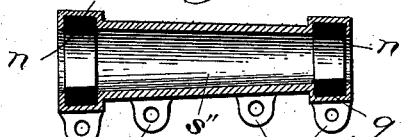
Witnesses:
Chas. E. Gaylord.
Chas. E. Gorton.
Inventor:
David G. Wyeth
By Newton Wyeth
Atty.

UNITED STATES PATENT OFFICE.

DAVID G. WYETH, OF NEWARK, OHIO.

SLEIGH-RUNNER FOR WHEELED VEHICLES.

SPECIFICATION forming part of Letters Patent No. 400,381, dated March 26, 1889.

Application filed March 2, 1888. Serial No. 265,941. (No model.)

*To all whom it may concern:*

Be it known that I, DAVID G. WYETH, of Newark, in the county of Licking and State of Ohio, and a citizen of the United States, have invented certain new and useful Improvements in Sleigh-Runners, which improvements are fully set forth in the following specification and accompanying drawings.

My invention relates to improvements in that class of sleigh-runners which are used independently of each other as attachments for wheeled vehicles by applying the same to the axles of such vehicles when the wheels are removed for the purpose to convert such vehicles into a form for use as a sled or sleigh.

I attain the objects of my invention through the mechanism illustrated in the accompanying drawings, in which the same letters refer to similar parts throughout the several views.

Figure 1 is a perspective view of the sleigh-runner as seen from a position to the right of the vehicle. Fig. 2 is a longitudinal and vertical sectional view through the center of the thimble or spindle covering s. Fig. 3 is a rear view of the sleigh-runner in vertical and lateral section through the center of the thimble s', but showing in perspective the clip B and a portion of the vehicle-axle A. Fig. 4 is a vertical section on the line 4, Fig. 3. Fig. 5 is a sectional view on the line 5, Fig. 3. Fig. 12 is a perspective view of the side plate, p, Fig. 1, as removed from the sleigh-runner. Fig. 6 is a perspective view of a sleigh-runner, showing adjustable axle-clamp C and packing R, detached thimble s'', and a portion of the vehicle-axle A. Figs. 7 and 8 show modified forms of the clamp C and packing R. Figs. 9 and 10 are sectional views at 9, Fig. 7. Fig. 11 is a longitudinal and vertical section of thimble s'', Fig. 6.

The thimble or spindle-covering s, Fig. 1, has at its inner end two wings or arms, w, only one of said wings appearing in view in Fig. 1, but both, w w, shown in section in Fig. 5. This thimble s, in Fig. 1, is secured to the sleigh-runner upon the rave r thereof by bolts, screws, or other suitable means passing through or around said wings and rave. The thimble fits loosely upon the spindle of the vehicle-axle, and is held thereon by the nut at the point of the spindle. On the under side of the thimble and at or near the outer end is placed a pair of perforated lugs, l, which receive the braces b and hold the same by a bolt. Said lugs and wings are integral or solid with the thimble. A side plate, p, Fig. 1, has overlying flanges or edges f f along those portions thereof which lie against the knees k k when the side plate is in place. Fig. 12 shows a perspective view of the side plate, p, as it appears removed. One side plate may be used upon each runner, as in Fig. 3, to strengthen the joints of the knees and rave when they are constructed in the usual manner by mortise and tenon joints; but preferably two side plates are used, one on either side of the runner, as shown in Figs. 1 and 2. The upper ends of the knees in such case are simply cut to come against the rave at the desired and proper angles, and the flanges f of the two side plates are clinched down tight to the knees and the side plates bolted or riveted together, and the rave and knees are thus securely and strongly held together and in place. In this manner of construction the usual mortise-and-tenon joints of the knees and rave are dispensed with and much time and labor thereby saved. At the bottom of the knees are T-plates t t, Figs. 1, 3, and 6, which have flanges or edges h h, similar to those upon the side plates, to clinch down on the knees in like manner.

Fig. 2 is a longitudinal and vertical section of the thimble s, Fig. 1, through its center. The concavity or spindle-bearing of the thimble is enlarged near either end to form annular grooves or recesses g g for the reception of a packing, cushions, or washers n n. This cushion makes an easy and noiseless bearing at each end of the spindle, and also preserves the spindle from being worn or injured by the thimble. The thimble may also be made with a smooth spindle-bearing throughout, as shown in section in Fig. 3.

In the use of ordinary axles, as provided for in Figs. 1 and 2, the thimble s is secured upon the spindle by the ordinary nut at the point of the spindle.

Fig. 3 shows my method of securing and bracing a sleigh-runner upon what is called a "mail-axle." In this form the outside braces, b, as in Fig. 1, are omitted, and the braces o o, Fig. 3, run from the inside or wagon side of the runner from the rave r and knees k to a convenient point under the axle A, as shown, and are secured to the axle by a clip, B. The details of the clip B, Figs. 3 and 4, are the clip c, the clip-bar c', provided with two lobes or ears, e e, perforated to receive a bolt, a. The braces o are preferably welded together and formed into a perforated head, as at q, to receive the bolt a, which fastens them to the clip; but they may be welded in pairs, or each brace may be flattened and formed into a perforated head at its end to receive said bolt. The bolt, when in place securing the braces to the clip, stands practically parallel with the axle of the vehicle, whereby at the junction of the clip and braces there is provided a working joint or connection, which allows the sleigh-runner to rock upon the spindle, and thus to conform to uneven ground-surfaces. In this method of securing a sleigh-runner upon a mail-axle the braces o are preferably and most conveniently four in number, one running from each of the knees k, the knees being arranged as k k, Fig. 1, and two from the rave r at points suitably distant on either side of the thimble s'. When secured by the clip B, these braces both hold the runner upon the spindle A' and help to keep it in its upright and proper position.

The thimble s, with grooves g g, Figs. 1 and 2, may be used upon the form of sleigh-runner shown in Fig. 3, and when intended to be so used the lug l may be omitted, and, on the other hand, the thimble s', without grooves, Fig. 3, may be made with a lug thereon like the lug l, Fig. 1, and thus be used the same as the thimble s, Fig. 1, is used, with the exception that the packing n will be discarded.

In Fig. 6, A is the axle of the vehicle, shown in section at a point just at the outside of the clamp C. A clip or clamp, C, clamps over the axle, and is rigidly secured to the rave r by bolts or clips. This clamp is made somewhat larger than the axle, and a convenient and flexible packing, R, of rubber, leather, or other suitable material, is inserted between the axle and the clamp. The side plate, P, has a raised or thickened point, i, and may also have the flanges f. The clamp C being somewhat larger than and inclosing a flexible packing about the axle, and the axle pivoting upon the point i, the sleigh-runner is allowed to play or rock to a limited extent over uneven track-surfaces, while at the same time it is prevented from overturning by the clamp C, which is made sufficiently near the size of the axle to be, with the packing inclosed, unable to revolve thereon.

Figs. 7 and 8 show modified forms of the clamp C, of convenient make or to conform to varied forms of axles and to axles surmounted with wood.

Fig. 9 is a sectional view at 9, Fig. 7, and shows a modified form of the clamp C, it having flanges or edges m m to hold the packing R from working out of the clamp.

Fig. 10 is also a sectional view at 9, Fig. 7, and shows a further modified form of the clamp C and of the packing R, the packing being wider than the clamp and having projecting edges j j to hold the packing in place. The packing R, if brought beneath the axle, as in Fig. 8, will be kept from working out of the clamp by the points i on the side plates P, when two side plates are used.

In this form of sleigh-runner, Fig. 6, from convenient and proper points, z, on the knees and rave, braces b run and converge to a detached thimble or spindle-covering, s''. This thimble is shown in longitudinal section in Fig. 11, and has grooves g g, similar to and for the same purpose as those in thimble s, Fig. 2.

The wood-work or frame-work of the sleigh-runner may be made substantially in the usual manner, consisting of a rave, r, Fig. 6, and runner u, meeting forward at d, and of the two knees k k, extending down from the rave in a fore-and-aft direction to the runner. Fig. 1 also exhibits my method of securing easily, neatly, and strongly the forward ends of the rave and runner together. These ends of the rave r and bent runner u are shortened and do not come together at d. The shoe v is continued forward and upward beyond the runner u to a proper height, as at d, and then bent back and brought upon the rave, and thereto secured by bolts or other suitable means. The shoe may be brought back upon the wing w, Figs. 1 and 5, or upon the clamp C, and in part secured by the bolt which fastens the thimble s or s', or the clamp C. By means of this extended shoe the fitting and fastening together of the wood rave and runner at d are saved.

I am aware that heretofore sleigh-runners as attachments for wheeled vehicles have been made with wood rave, runner, and knees substantially as those parts are shown in Fig. 6, and also with a spindle-covering, fastened upon the rave of the sleigh-runner, as well as with a detached spindle-covering having lugs, to which converging braces are fastened. I therefore do not claim such combinations, broadly; but, What I do claim as new and of my invention, and desire to secure by Letters Patent, is—

1. The combination, in a sleigh-runner for wheeled vehicles, of the thimble s, having the wings w w and the lugs l, integral therewith, and having the grooves g g and the packing n n, the side plates, p, with flanges f f, and the T-plates t with flanges h h, and the braces b, all substantially as set forth.

2. The combination, in a sleigh-runner for wheeled vehicles, of the thimble s', having wings w w, the side plate, p, having flanges f f, the clip B, and the braces o, running from the rave and knees of the sleigh-runner from the inside to and so arranged with said clip as to make a working-joint at the connection of said braces and clip, all substantially as set forth.

3. The combination, in a sleigh-runner for wheeled vehicles, of the thimble $s$, having lugs $l$ and wings $w\,w$, integral therewith, and the braces $b$, all substantially as set forth.

4. The thimble $s$, having wings $w\,w$ and lugs $l$, integral therewith, and having also the annular grooves $g\,g$ to receive a packing, substantially as set forth, for the purpose specified.

5. The thimble $s'$, having wings $w\,w$ and the lugs $l$, integral therewith, substantially as shown, for the purpose specified.

6. The thimble $s'$, having wings $w\,w$ and lugs $l$, integral therewith, substantially as shown, for the purpose specified.

7. The thimble $s$, having wings $w\,w$, integral therewith, and with annular grooves $g\,g$ for the reception of a packing, substantially as set forth, for the purpose specified.

8. The combination, in a sleigh-runner attachment for wheeled vehicles, of the clamp C, packing R, and the side plate P, having the pivotal point $i$, in connection with a detached thimble, $s''$, and braces $b$, all substantially as set forth.

9. The combination, in a sleigh-runner for wheeled vehicles, of the clamp C, packing R, and the side plate, P, having the pivotal point $i$, substantially as set forth.

10. The combination, in a sleigh-runner for wheeled vehicles, of the clamp C, packing R, two side plates, P, one of said side plates having the pivotal point $i$, and both having flanges $f\,f$ in connection with unmortised and untenoned knees and rave $k\,k$ and $r$, substantially as set forth.

11. The combination, in a sleigh-runner for wheeled vehicles, of the thimble $s'$, having wings $w\,w$ and lugs $l$, and the braces $b$, substantially as set forth.

12. The combination, in a sleigh-runner for wheeled vehicles, of two side plates, $p\,p$, each having four flanges, $f$, with unmortised and untenoned knees and rave $k\,k$ and $r$, substantially as set forth.

13. The combination, in a sleigh-runner for wheeled vehicles, of the thimble $s'$, having wings $w\,w$, the clip B, and the braces $o$, substantially as set forth.

14. The combination, in a sleigh-runner for wheeled vehicles, of the thimble $s'$, having the wings $w\,w$ and the lugs $l$, the braces $b$, and the side plates, $p$, all substantially as set forth.

15. The combination, in a sleigh-runner for wheeled vehicles, of the thimble $s'$, having wings $w\,w$ and lugs $l$, the braces $b$, the shortened rave and runner $r$ and $n$, and the extended shoe $v$, all substantially as set forth.

DAVID G. WYETH.

Witnesses:
WRIGHT D. WYETH,
T. M. KIMBLE.